United States Patent [19]
Cohen

[11] Patent Number: 5,196,255
[45] Date of Patent: Mar. 23, 1993

[54] EXTRUDED PLASTIC SLAT

[76] Inventor: John M. Cohen, 6500 Newburgh Rd., Evansville, Ind. 47715

[21] Appl. No.: 723,913

[22] Filed: Jul. 1, 1991

[51] Int. Cl.⁵ .......................... B32B 3/20; B32B 3/00
[52] U.S. Cl. .................................... 428/188; 428/33; 428/36.9; 428/44; 428/48; 428/52; 428/53; 428/56; 428/58; 428/99; 428/119; 428/120; 428/212; 428/192; 52/273; 52/284; 52/578; 52/582
[58] Field of Search .............. 428/178, 188, 189, 192, 428/33, 34.1, 36.9, 44, 48, 52, 53, 56, 58, 61, 81, 99, 120, 119, 212; 52/273, 284, 578, 582

[56] References Cited

U.S. PATENT DOCUMENTS 3,495,628  2/1970  Boender .......................... 428/188
3,679,531  7/1972  Wieuand et al. .................. 428/188

Primary Examiner—Donald J. Loney

[57] ABSTRACT

An extruded slat defined by a series of longitudinal cavities disposed in a side-by-side relationship. Typically, the longitudinal cavities total in odd numbers so that fastening can be achieved through a single cavity. The slat is fabricated from plastic resin, is light in weight, is readily cut and can be arranged into a variety of configurations. Assembly between the ends of abutting slats is usually accomplished by an interconnecting pin(s) between communicating cavities. Each longitudinal cavity is also adapted to receive a rod, a cable, or the like, serving for example, reinforcing, communication and/or communication purposes, or other uses involving concealment and/or security.

11 Claims, 1 Drawing Sheet

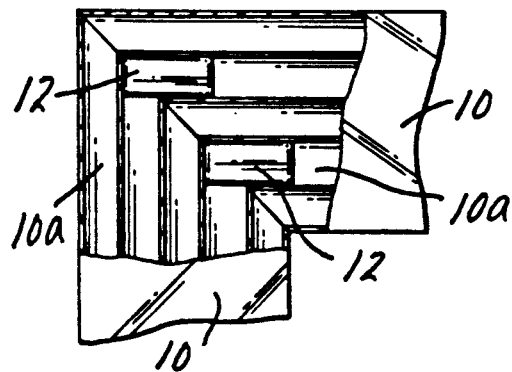
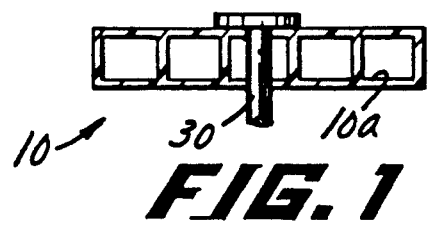
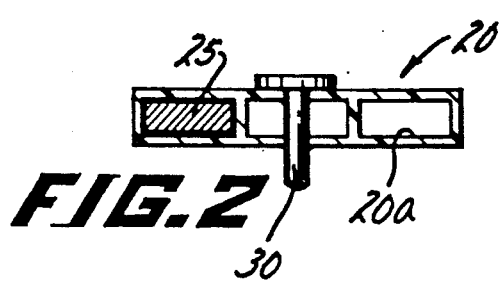
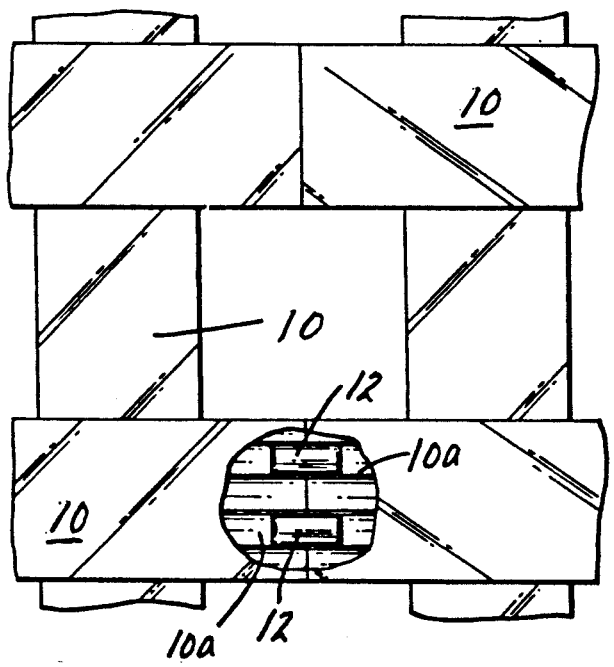
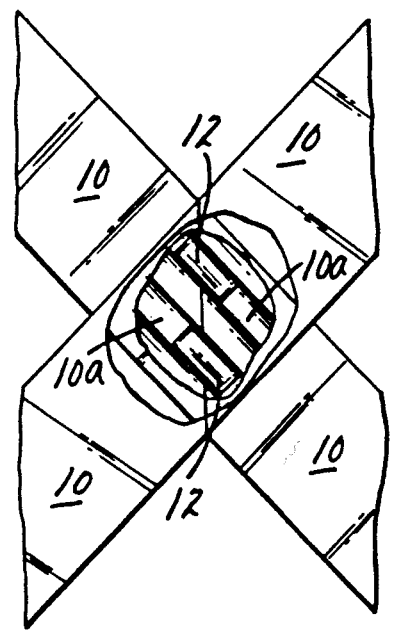
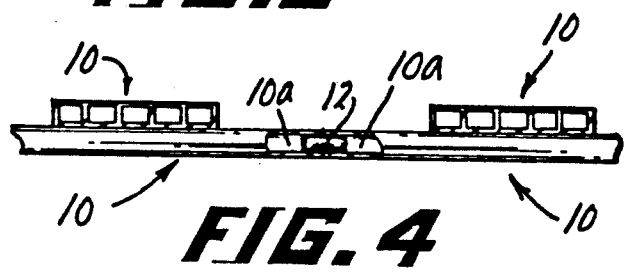

EXTRUDED PLASTIC SLAT

BACKGROUND OF THE INVENTION

As is known, material in the form of slats or strips has a variety of end usages including, by way of example, for trim, fencing (as rectangular or lattice styles), and the like, being principally formed from wood to achieve the slat appearance. Such material, however, is frangible to some extent, being subject to cracking, splintering, poor strength and/or other physical characteristics, and, oftentimes, is unhandy in customizing for securement.

DESCRIPTION OF THE INVENTION

The invention overcomes the preceding deficiencies characterized by a wooden slat in presenting a slat, typically made from extruded polyvinyl chloride (PVC), and defined by a series of side-by-side longitudinal cavities. The aforesaid cavities serve multi-purposes provided, again by way of example, for the receiving of a fastener for slat placement purposes, the receipt of a pin(s) to maintain abutting slats in an assembled relationship, and the usage a of pin(s) to accomplish a slat assembly defined by a right angle or mitered joint.

The aforesaid elongated cavities also variously serve, as desired, to receive reinforcement material, for the passage of communication lines, and for generally locating utility lines where security and/or concealment is a factor.

DESCRIPTION OF THE FIGURES

In any event, a better understanding of the present invention will become more apparent from the following description, taken in conjunction with the accompanying drawing, wherein FIG. 1 is a view in vertical section showing one form of extruded plastic slat accordance with the teachings of the invention;

FIG. 2 is another view in vertical section, in this instance showing another form of extruded plastic slat in accordance with the teachings of the invention;

FIG. 3 is a top plan view of a lattice assembly, in rectangular form, particularized by the assembly relationship at the cut-out area;

FIG. 4 is a view in vertical section, partly broken away, looking from the bottom to the top of FIG. 3, further illustrating the assembled relationship;

FIG. 5 is a top plan view of slats arranged in a diagonal lattice pattern, showing, at the cut-out area, a typical assembled relationship; and, FIG. 6 is a top plan view, also including a cut-out area, showing an arrangement presenting a right angle or mitered joint and particularizing the assembly of such.

For the purposes of promoting and understanding of the principles of the invention, reference will now be made to the embodiment illustrated in the drawing and specific language will be used to describe the same. It will be understood that no limitation of the scope of the invention is thereby intended, such alterations and further modifications in the illustrated device, and such further applications of the principles of the invention as illustrated therein being contemplated as would normally occur to one skilled in the art to which the invention relates.

DESCRIPTION OF THE PREFERRED EMBODIMENT

Referring now to FIGS. 1 and 2, typical slats 10 and 20 are illustrated, where in FIG. 1 the slat 10 presents five side-by-side longitudinal cavities 10a (providing structural strength) and, in FIG. 3, three longitudinal side-by-side cavities 20a are illustrated. While not critical, the usage of an odd number of cavities 10a,20a is appropriate so that fastening, at 30, can be accomplished through a single cavity. As obvious, the length of each slat 10,20 depends on end needs.

FIG. 2 further shows the usage of one of the longitudinal cavities 20a for receiving a rod and/or cable 25, serving purposes of strength, security and/or concealment. In other words, the slats or strips 10,20 of the invention might well contain wiring for an audio system, serving utilitarian purposes and, as well, those of aesthetics in installation.

FIG. 3 shows slats 10 arranged for a rectangular lattice pattern, while FIG. 5 shows an arrangement of slats 10 forming a diagonal lattice pattern. As the cut-out areas in FIGS. 3 and 5 each disclose and, as well, that of FIG. 4, pins 12 serve to interconnect corresponding longitudinal cavities 10a in abutting slats 10. The juncture line of the slats 10, in FIG. 3, is normal to the longitudinal axis of the abutting slat 10 while the juncture line of a slats 10 in FIG. 5 is at an angle of 45°.

In any event, the placement of pins 12 is arbitrary both in number and in location. Also, since each layer of slats 10 is in a different plane (see FIG. 4), an adhesive (neither shown nor numbered) or other joining method may be used to complete the assembly in each instance.

FIG. 6 is directed to an arrangement of slats at a corner, for example, i.e. where the slats 10 are mitered or at right angles with respect to each other. Pins 12, again, establish positive placement, with a pin 12 extending from one cavity at the end of one slat 10 to a corresponding cavity at the end of the next abutting slat 10. FIG. 6, therefore, serves to further demonstrate the versatility of the use of the extruded plastic slat of the invention.

It should be evident from the preceding that the slat presented by the invention is light in weight, durable in use, may be impervious to weather (due to material formulation), and is easily assembled to satisfy an end need. As stated, the length of a slat is largely dependent upon use requirements, where the material is workable at a use site, i.e. is readily cut and arranged as desired.

The extruded plastic slate described above is susceptible to various changes within the spirit of the invention, as, for example, proportioning of the individual longitudinal cavities; the selection of material employed; the manner of interconnecting abutting slats, and, the like.

Thus, the preceding should be considered illustrative and not as limiting the scope of the following claims.

I claim:

1. A slat assembly comprising an extended plastic first body defined by a series of longitudinal cavities disposed in a side-by-side relationship and arranged in a coplanar relationship with an extruded plastic second body also defined by a series of longitudinal cavities disposed in a side-by-side relationship, and fastening means extending between and within contiguous longitudinal cavities in said first body and in said second body.

2. The slat of claim 1 where an odd number of longitudinal cavities are presented.

3. The slat of claim 1 where said contiguous longitudinal cavities in said first body and said second body are abutting and in-line .

4. The slat of claim 3 where said abutting contiguous longitudinal cavities define a line of juncture normal to the longitudinal axis of said first body and said second body.

5. The slat of claim 3 where said abutting contiguous longitudinal cavities define a line of juncture at a 45° angle with respect to the longitudinal axis of said first body and said second body.

6. The slat of claim 1 where certain of said slats abut other of said slats in a mitered assembled relationship.

7. The slat of claim 1 where said fastening means is a pin.

8. The slat of claim 1 where one of said longitudinal cavities receives means serving reinforcing purposes.

9. The slat of claim 1 where one of said longitudinal cavities receives means serving a concealing relationship.

10. The slat of claim 1 where one of said longitudinal cavities receives means serving a security relationship.

11. The slat of claim where said plastic is a polyvinyl chloride resin.

* * * * *